United States Patent [19]

Fogelberg

[11] 4,192,411
[45] Mar. 11, 1980

[54] AUTOMATIC LOCKING CLUTCH

[75] Inventor: Mark J. Fogelberg, Muncie, Ind.

[73] Assignee: Borg-Warner Corporation, Chicago, Ill.

[21] Appl. No.: 912,609

[22] Filed: Jun. 5, 1978

Related U.S. Application Data

[63] Continuation of Ser. No. 799,793, May 23, 1977, abandoned.

[51] Int. Cl.² .............................................. B60K 17/34
[52] U.S. Cl. ...................................... 192/36; 180/245; 192/49; 192/67 R; 192/93 A
[58] Field of Search ................... F16D/11/00; 192/35, 192/36, 67 R, 49, 93 A; 180/44 R, 49

[56] References Cited

U.S. PATENT DOCUMENTS

| | | | |
|---|---|---|---|
| 2,888,114 | 5/1959 | Bostock | 192/49 X |
| 3,217,847 | 11/1965 | Petrak | 192/67 R X |
| 3,651,906 | 3/1972 | Slator et al. | 192/35 |
| 3,656,598 | 4/1972 | Goble | 192/35 |

*Primary Examiner*—Allan D. Herrmann
*Attorney, Agent, or Firm*—Julian Schachner

[57] ABSTRACT

A clutch for engaging a driving member with a driven member automatically upon application of torque to rotate the driving member in either direction, for maintaining engagement in either the drive or coast mode of operation and during the transition between drive and coast, for maintaining engagement in either forward or reverse operation and during the transition between forward and reverse, and for disengaging automatically upon interruption of the torque and slight rotation in the opposite direction.

29 Claims, 8 Drawing Figures

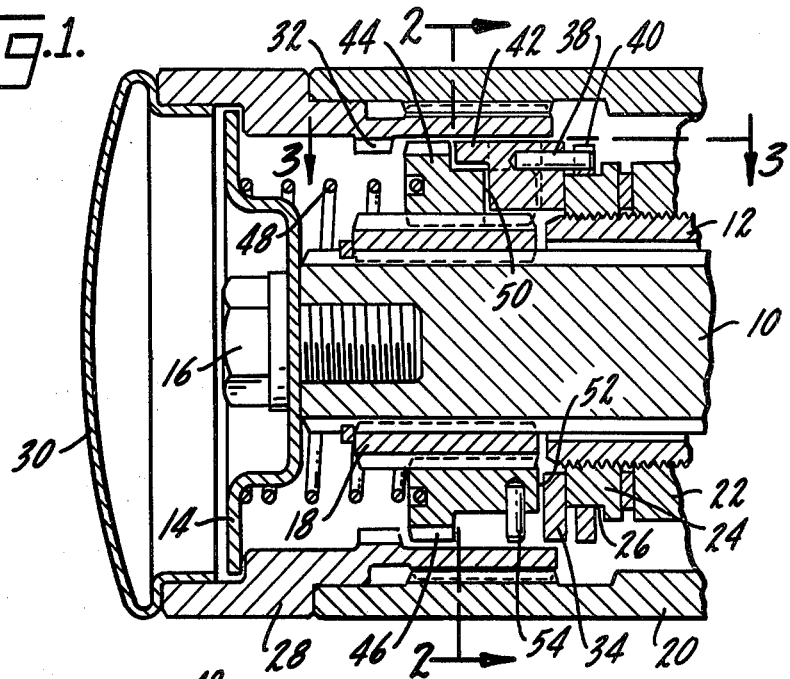
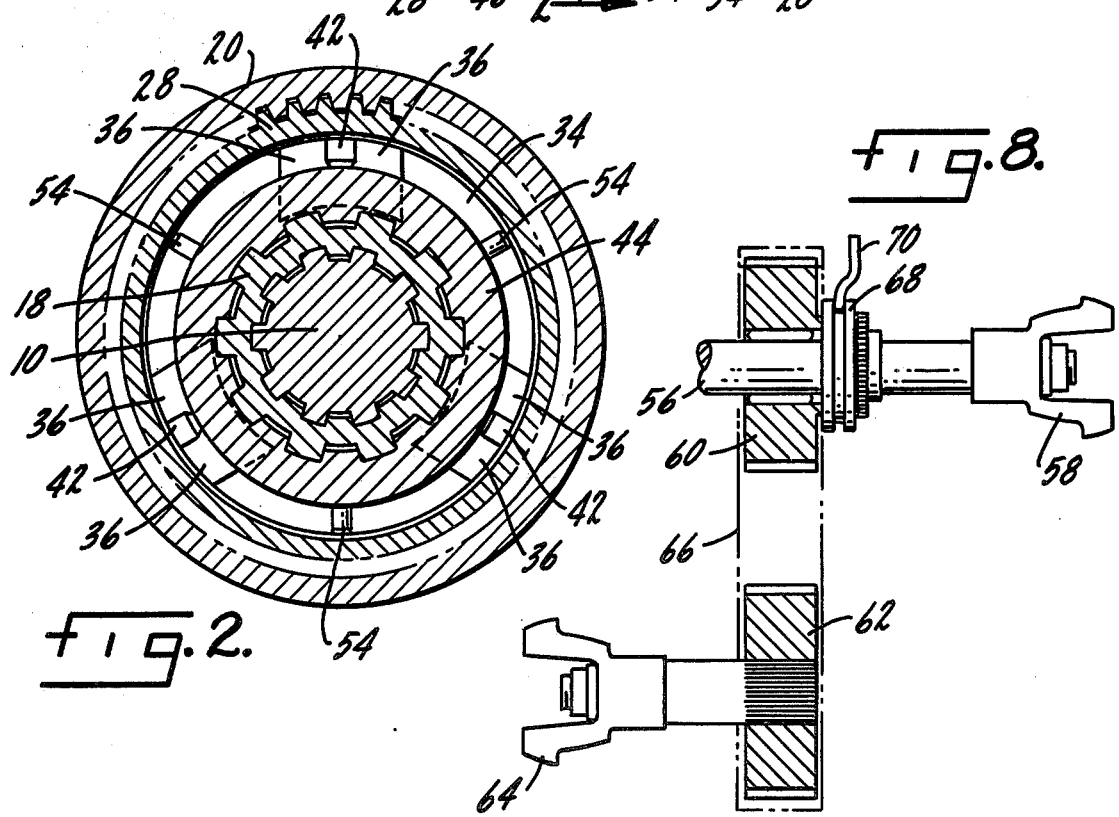

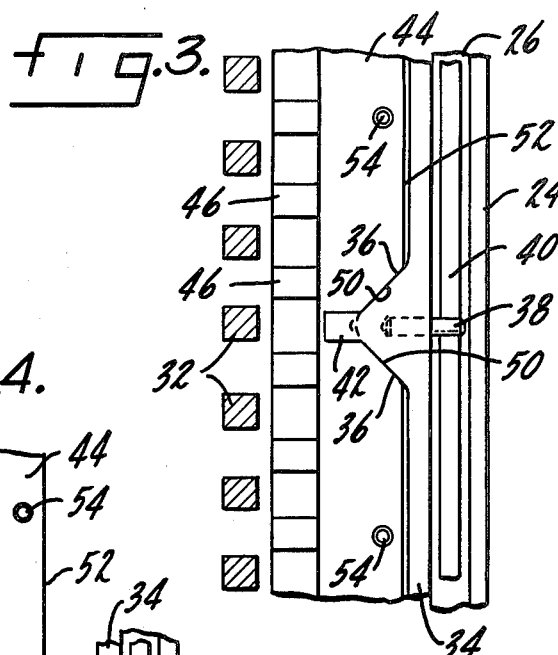
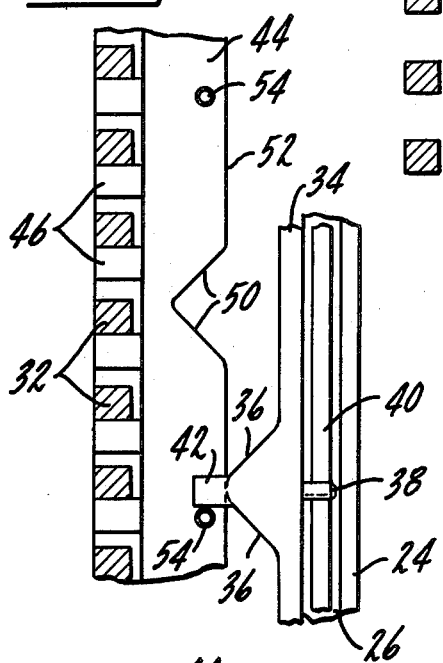
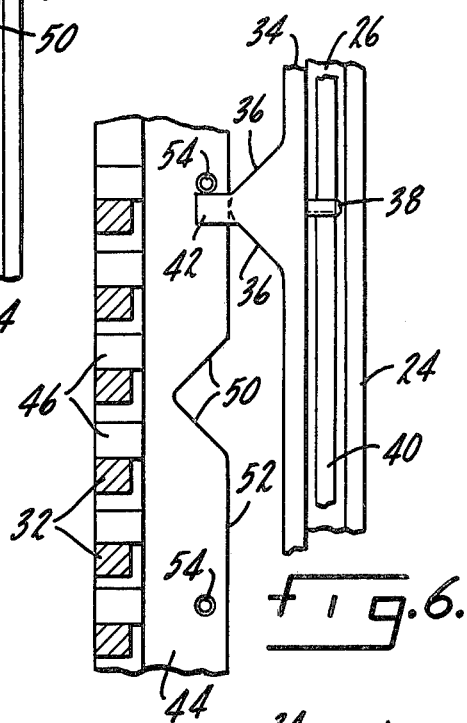
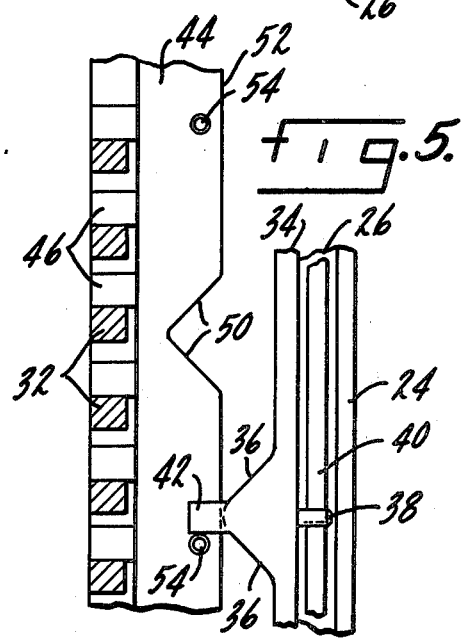
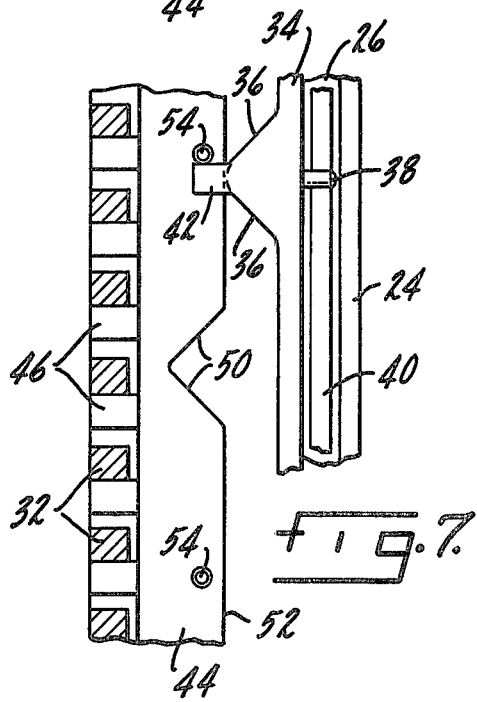

AUTOMATIC LOCKING CLUTCH

This is a continuation of application Ser. No. 799,793 filed May 23, 1977 now abandoned.

BACKGROUND OF THE INVENTION

This invention relates generally to clutches. More particularly, it relates to a clutch for use in effecting locking engagement between a front drive axle and a front wheel of a four-wheel drive vehicle in response to the application of power to the front drive axle. The clutch automatically effects disengagement upon cessation of the application of power to the front drive axle, together with a direction reversal.

Heretofore, various clutching mechanisms have been used for engaging a front drive axle with its associated wheels in a four-wheel drive vehicle. One such mechanism normally is disengaged to allow the wheels to rotate independently of the front drive system. This requires that the operator lock each clutch manually to engage the front drive axle and wheels, and to unlock them manually to disengage.

Another such mechanism provides an overrunning clutch which engages automatically when power is applied to the front drive axle and when operation is in the drive mode. However, such an overrunning clutch disengages automatically upon operation in the coast mode. In other words, the overrunning clutch engages when the rotational speed of the axle tends to exceed the rotational speed of the wheel, but disengages when the rotational speed of the wheel tends to overrun that of the axle. Such overrunning clutches generally provide some means by which the operator may override manually to insure locking engagement between the axle and wheels.

Yet another such mechanism provides a clutch which operates in response to the application of torque to the front drive axle to move pins into slots so as to engage the axle with its associated wheels. Although a mechanism of this type will effect engagement in either the drive or coast mode of operation, there is the possibility that the pins will slip out of the slots during movement between drive and coast, in which case the clutch would disengage and then re-engage automatically. At normal operating speeds such disengagement and re-engagement could cause severe shocks to the clutch components and, indeed, to the entire front drive line. This would result in a dangerous and possibly destructive condition. Further, in a float condition wherein the axle is rotating but no torque is transferred between the axle and wheels, an inadvertent tendency for movement between the drive and coast modes of operation could develop. This could cause the clutch to disengage and then re-engage, and establish the same dangerous condition.

There remains a need in the art for a clutch which will automatically engage a front drive axle and an associated wheel in response to engagement of the front wheel drive system, which will maintain engagement positively in the drive and coast modes of operation as well as during the transition between drive and coast, which will maintain engagement positively in forward and reverse operation as well as during the transition between forward and reverse, and which will disengage automatically upon disengagement of the front wheel drive system.

SUMMARY OF THE INVENTION

A primary object of this invention is to provide an improved automatic clutch which will meet the need noted above. The invention is directed to an improved clutch for automatically effecting engagement between driving and driven members in response to rotation of the driving member. The clutch maintains positive engagement between the members so long as the driving member is subject to rotation, and disengages automatically upon slight opposite rotation when the driving member is not subject to rotation. The clutch of the present invention is adapted for use in four-wheel drive vehicles where it is desirable to provide automatic engagement of the front wheels when the operator engages the front wheel drive system. The clutch is operative when the vehicle is engaged in forward or reverse, and maintains engagement positively until the operator shifts out of four-wheel drive and reverses vehicle direction momentarily.

The clutch of this invention includes a movable clutching sleeve associated with a driving member and a fixed clutching sleeve associated with a driven member. The movable clutching sleeve is positively cammed into locking engagement with the fixed clutching sleeve upon rotation of the driving member. A blocking device prevents inadvertent disengagement of the clutching sleeves in the event of a tendency for the driven member to overrun the driving member. As a result, the positive locking relationship is maintained in the drive and coast modes of operation as well as during transition between drive and coast. Furthermore, the arrangement is such that engagement is maintained when the driving member is rotated in forward or reverse as well as during transition between forward and reverse drive.

BRIEF DESCRIPTION OF THE DRAWINGS

The objects and advantages of this invention will become apparent to those skilled in the art upon careful consideration of the specification herein, including the drawings, wherein:

FIG. 1 is a sectional view showing details of the improved automatic locking clutch;

FIG. 2 is a sectional view taken along the line 2—2 of FIG. 1 showing additional details of the clutch;

FIG. 3 is a developed view taken along the line 3—3 of FIG. 1 showing the clutch in its disengaged position;

FIG. 4 is a developed view similar to FIG. 3 showing the clutch in its forward drive position;

FIG. 5 is a developed view similar to FIG. 3 showing the clutch in its forward coast position;

FIG. 6 is a developed view similar to FIG. 3 showing the clutch in its reverse drive position;

FIG. 7 is a developed view similar to FIG. 3 showing the clutch in its reverse coast position; and FIG. 8 is a schematic view showing an associated transfer case for use in conjunction with the clutch.

While this invention is susceptible of embodiment in many different forms, there is shown in the drawings and herein will be described in detail a preferred embodiment, with the understanding that the present disclosure is to be considered as an exemplification of the principles of the invention, and is not intended to limit the invention to this embodiment.

DESCRIPTION OF THE PREFERRED EMBODIMENT

Referring to the drawings now in greater detail, and with particular reference to FIGS. 1, 2, and 3, there is shown a driving member or shaft 10, which in one preferred form of the invention is the front axle of a four-wheel drive vehicle. Axle 10 is rotatably supported in a conventional manner within an axle housing 12. Axle 10 extends outwardly beyond the spindle of housing 12, and a spring retainer 14 is secured to the outer end thereof by a bolt 16 or the like. A collar 18 is secured to axle 10 for rotation therewith, and is oriented between the spindle of housing 12 and spring retainer 14.

A driven member 20, which in one preferred form of the invention is the front wheel hub of a four-wheel drive vehicle, is supported by a conventional bearing, not shown, for rotation about housing 12. Lock nuts 22 and 24 secure this bearing in the usual manner. However, lock nut 24 defines a smooth annular surface 26.

A hub extension sleeve 28 is secured to wheel hub 20 for rotation therewith. Hub extension 28 extends outwardly beyond spring retainer 14 and bolt 16, and a suitable cap 30 closes its outer end. Hub extension 28 defines a plurality of clutch teeth 32.

An annular cam 34 is spaced from the spindle of housing 12 and from collar 18 so as to be rotatable relative thereto. Cam 34 defines outwardly converging cam surfaces 36. A pin 38 is secured to cam 34 and extends inwardly therefrom. A drag ring 40, in frictional contact with surface 26 of lock nut 24, is engaged by pin 38. Cam 34 also defines a plurality of outwardly extending fingers 42.

An axle clutch sleeve 44 is splined to collar 18 for rotation therewith and sliding movement relative thereto. Sleeve 44 defines a plurality of clutch teeth 46 adapted for meshing engagement with teeth 32 of hub extension 28. A suitable spring 48 reacts against spring retainer 14 and biases sleeve 44 inwardly such that teeth 46 normally are out of meshing engagement with teeth 32. Sleeve 44 defines a plurality of cam follower means comprising surfaces 50. Surfaces 50 diverge inwardly toward an inner smooth surface 52. Sleeve 44 also supports a plurality of cam stop pins 54.

Cam surfaces 36 of cam 34 and cam follower surfaces 50 of sleeve 44 are complimentary. With sleeve 44 in the position shown in FIG. 1, surfaces 36 and 50 are in the position shown in FIG. 3. Teeth 32 and 46 are out of mesh, and wheel hub 20 rotates freely about stationary axle 10 with the associated vehicle in two-wheel drive.

When the operator desires to establish four-wheel drive, he directs power to axle 10. In this condition, axle 10 is subject to rotation Collar 18 and sleeve 44 rotate with axle 10. The force developed by the frictional contact of drag ring 40 with lock nut 24 is sufficient such that rotation of cam 34 is retarded. Surfaces 50 ride outwardly on surfaces 36, and sleeve 44 is moved outwardly against the biasing force of spring 48 from the position shown in FIG. 3 to the position shown in FIG. 4. Surface 52 rides along the outwardmost point of surfaces 36 until pins 54 abutt fingers 42, whereupon cam 34 is rotated with sleeve 44. Teeth 46 are moved outwardly into meshing engagement with teeth 32, and a positive driving engagement is established between axle 10 and wheel hub 20. Teeth 32 and 46 are constructed such that the backlash therebetween is smaller than the distance between the inner end of each surface 50 and an adjacent pin 54 along surface 52.

When the vehicle shifts from drive to coast, as for example when the operator lifts his foot off of the accelerator, hub 20 tends to overrun axle 10. In this condition teeth 32 shift from the position shown in FIG. 4 to the position shown in FIG. 5. In effect, an engine braking condition is established. Pins 54 continue to abutt fingers 42, and sleeve 44 continues to rotate cam 34 and drag ring 40 relative to lock nut 24. The vehicle may shift back and forth between drive and coast, but teeth 32 and 46 will remain in meshing engagement, thus ensuring that four-wheel drive operation is maintained.

When the operator desires to move the vehicle in reverse, he stops the vehicle, shifts the transmission out of a forward gear and into reverse gear, and then starts the vehicle once again, all the while remaining in four-wheel drive. Because the backlash between teeth 32 and 46 is smaller than the distance between surfaces 50 and pins 54, tooth contact is established before surfaces 50 come into contact with surfaces 36. Sufficient pressure is established between teeth 32 and 46 such that sleeve 44 is held against the biasing force of spring 48 as it moves from the position shown in FIG. 4, for example, to the position shown in FIG. 6. Cam follower surfaces 50 do not ride down cam surfaces 36, and four-wheel drive operation is maintained. When in reverse, the vehicle may shift between the drive mode shown in FIG. 6 and the coast mode shown in FIG. 7 while remaining positively engaged for four-wheel drive operation.

An important advantage of the arrangement disclosed herein is that a positive drive condition is maintained in both the drive and the coast modes, either in forward or reverse. This positive drive is established automatically, thereby eliminating any need for manually locking the wheel hubs.

When the operator desires to establish two-wheel drive, he stops the vehicle and discontinues the transfer of power to axle 10. In this condition, axle 10 no longer is subject to rotation. The operator then moves the vehicle in the reverse direction sufficiently to align surfaces 36 and 50. Spring 48 biases sleeve 44 inwardly to the position shown in FIGS. 1 and 3. The operator may then proceed in either direction in two-wheel drive.

In one preferred form of the invention, direct drive may be established from an engine to a rear drive axle, with offset drive being established to a front drive axle. As shown in FIG. 8, one example of such an arrangement includes a transfer case having an input 56 adapted to receive power from the transmission of a four-wheel drive vehicle. A rear output 58 is connected directly to input 56, and is connected through a rear propeller shaft to the rear axle. A sprocket 60 is journaled for rotation relative to input 56, and a complimentary sprocket 62 is secured to a front output 64 which is connected through a front propeller shaft to front axle 10. A suitable chain 66 couples sprockets 60 and 62 for power transfer therebetween. A clutch 68 is controllable by the vehicle operator through a suitable actuating mechanism 70. In one position, clutch 68 disengages sprocket 60 from input 56 such that power is transferred from input 56 to output 58, but not to output 64. Two-wheel drive is established. In another position, clutch 68 engages sprocket 60 with input 56 such that power is transferred from input 56 to both outputs 58 and 64. With clutch 68 engaged and power transferred to output 64, front axle 10 will rotate and four-wheel drive will be established automatically.

Thus it will be seen that positive drive is established automatically in both the drive and coast modes of operation when four-wheel drive is engaged. The automatic feature eliminates any necessity for manual lock-up in order to insure positive drive. The automatic feature maintains four-wheel drive in either the drive or coast modes, and during the transition between drive and coast. Similarly, four-wheel drive is maintained in either forward or reverse gears, and during the shift between forward and reverse.

It should be apparent that although the invention as disclosed herein provides a novel arrangement for clutching the front drive axle and its associated wheels in a four-wheel drive vehicle, it is applicable as well for clutching the rear drive axle and its associated wheels. Further, it is readily available for use in any environment where automatic clutching between driving and driven members is desired.

It is to be understood that while the preferred embodiment of the invention has been shown and described, this should be considered as illustrative and may be modified by those skilled in the art without departing from the scope thereof, which is to be limited only by the claims herein.

I claim:

1. A clutch adaptable for effecting engagement between rotatable driving and driven members in response to rotation of the driving member, said clutch comprising first and second clutching means respectively rotatable with said driving and driven members, said first clutching means being movable relative to the driving member into and out of locking engagement with said second clutching means, means yieldably biasing said first clutching means out of locking engagement with said second clutching means, rotatable cam means, and means resisting rotation of said cam means, said first clutching means defining cam follower means cooperable with said cam means for moving said first clutching means into locking engagement with said second clutching means in response to rotation of the driving member, said first clutching means also defining means for rotating said cam means therewith upon effecting said locking engagement with said second clutching means, whereby said first clutching means is prevented from moving out of locking engagement with said second clutching means so long as the driving member is subject to rotation.

2. The invention of claim 1, said first and second clutching means respectively defining first and second sets of clutch teeth for establishing said locking engagement, said teeth having a predetermined backlash, and said first clutching means being constructed such that said cam rotating means is spaced from said cam follower means by a distance greater than said backlash.

3. The invention of claim 2, said cam rotating means being at least one stop pin engageable with said cam means, said stop pin being spaced from said cam follower means by a distance greater than said backlash.

4. An automatic clutch disposed for selective locking engagement of a first member with a second member to be driven when rotation is imparted to the first member, said clutch comprising first clutching means secured to the first member for rotation therewith and movement relative thereto, said first clutching means defining a first set of clutch teeth and a cam follower, second clutching means secured to the second member for rotation therewith, said second clutching means defining a second set of clutch teeth, said first and second sets of clutch teeth being adapted for meshing engagement in drive and coast modes, resilient means biasing said first clutching means away from said second clutching means such that said clutch teeth are out of meshing engagement, a rotatable cam, and means tending to retard rotation of said cam, said first clutching means being positively cammed toward said second clutching means by said cam in response to rotation of the first member until said clutch teeth are in meshing engagement, said cam being rotatable with said first clutching means upon continued rotation of the first member.

5. The invention of claim 4, said cam being rotatable with said first clutching means as said clutch teeth move between meshing engagement in the drive mode and meshing engagement in the coast mode.

6. The invention of claim 5, said first clutching means being rotatable relative to said cam for a predetermined distance in response to a reversal of the direction of rotation of said first member, said cam being rotatable with said first clutching means in the reverse direction thereafter.

7. The invention of claim 6, said clutch teeth when in meshing engagement tending to develop sufficient force to overcome the force of said resilient means and prevent said first clutching means from moving away from said second clutching means.

8. The invention of claim 4, said first and second sets of clutch teeth having a predetermined backlash, said cam defining a finger, said first clutching means supporting a pair of stop pins, each of said stop pins being spaced from said cam follower by a distance greater than said backlash, one of said stop pins abutting said finger for effecting rotation of said cam with said first clutching means upon rotation of said first member in one direction, and the other of said stop pins abutting said finger for effecting rotation of said cam with said first clutching means upon rotation of said first member in the other direction.

9. The invention of claim 8, said clutch teeth when in meshing engagement tending to develop sufficient force to overcome the force of said resilient means and prevent said first clutching means from moving away from said second clutching means.

10. A clutch for automatically engaging and disengaging an inner drive axle and an outer concentric wheel hub in a four-wheel drive vehicle wherein the axle is mounted in a stationary axle housing and includes a splined end portion projecting outwardly from one end of the housing, said clutch comprising a first clutch sleeve disposed on the splined end portion of the axle for rotation therewith, said first clutch sleeve having a first set of teeth, a second clutch sleeve connected to the hub for rotation therewith, said second clutch sleeve having a second set of teeth, said first and second sets of teeth being adapted for meshing engagement in drive and coast modes of operation and defining a predetermined backlash, a rotatable actuator disposed inwardly of said first clutch sleeve, means tending to retard rotation of said actuator, said actuator defining an outwardly extending cam, said first clutch sleeve defining an inner end surface and a cam follower, a spring biasing said first clutch sleeve inwardly such that said first and second sets of teeth are out of meshing engagement, rotation of the axle and said first clutch sleeve causing said cam follower to ride said cam outwardly such that said first and second sets of teeth are cammed into meshing engagement and said inner end surface rides on said cam, said first sleeve having holdout means spaced from said cam follower by a distance greater than said backlash, said holdout means being engageable with said actuator for rotating said actuator with said first clutch sleeve after relative rotation therebetween by said distance greater than said backlash.

11. The invention of claim 10, said holdout means being a pair of elements on either side of said cam follower, one of said elements being engageable said actuator for rotation thereof in one direction and the other of 15. An automatic clutch comprising first and second rotatable members, first and second clutch elements respectively rotatable with said first and second members, said elements being engageable in drive and coast modes, said first element being movable relative to said first member toward and away from engagement with said second element, means for moving said first element toward engagement with said second element upon rotation of said first member in one direction responsive to rotation of said second member in said one direction when said first member is not subject to rotation for sliding said first element to said first position.

22. An automatic clutch comprising first and second rotatable members, first and second clutch elements respectively rotatable with said first and second members, said first element being movable relative to said first member between first and second positions, said first and second elements being relatively rotatable between engagement in drive and coast modes when said first element is in said second position, means for moving said first element to said second position in response to rotation of said first member, means for retaining said first element in said second position so long as said first member is subject to rotation irrespective of said relative rotation of said first and second elements between engagement in said drive and coast modes, means for maintaining said first element in said second position as the direction of rotation of said first member is reversed, and means biasing said first element for movement toward said first position.

23. The invention of claim 22, said first and second elements defining said means for maintaining said first element in said second position as the direction of rotation of said first member is reversed.

24. An automatic clutch comprising first and second rotatable members, first and second clutch elements respectively rotatable with said first and second members, said first element being movable between first and second positions, said elements being relatively movable between engagement in drive and coast modes when said first element is in said second position, means responsive to rotation of said first member in one direction for moving said first element to said second position, means for retaining said first element in said second position so long as said first member is subject to rotation in said one direction irrespective of said relative movement of said elements, means for maintaining said first element in said second position as the direction of rotation of said first member is changed from said one direction to the opposite direction, said retaining means also being effective for retaining said first element in said second position so long as said first member is subject to rotation in said opposite direction irrespective of said relative movement of said elements, and means biasing said first element for movement toward said first position.

25. The invention of claim 24, said elements being relatively rotatable for effecting said engagement in said drive and coast modes, said retaining means being effective for retaining said first element in said second position irrespective of said relative rotation of said elements.

26. The invention of claim 23, 24 or 25, said maintaining means including clutch teeth defined by said elements, said clutch teeth being adapted for meshing engagement in said drive and coast modes, said meshing engagement negating the effect of said biasing means as the direction of rotation of said first member is changed.

27. The invention of claim 25 or 26, said moving means including a rotatable cam, means tending to retard rotation of said cam, and a rotatable cam follower coupled with said first element, said cam and cam follower defining said retaining means.

28. The invention of claim 27, said cam having a cam surface, and said cam follower having rise and dwell surfaces, said rise and cam surfaces being in contact when said first element is in said first position, said dwell and cam surfaces moving into contact as said first element is moved to said second position, and said cam and cam follower defining means for rotating said cam with said cam follower to retain said dwell and cam surfaces in contact when said first element is in said second position irrespective of said relative rotation of said first and second elements between engagement in said drive and coast modes.

29. The invention of claim 28, said maintaining means developing a force sufficient to overcome the force of said biasing means and thus maintain said first element in said second position with said rise and cam surfaces out of contact as the direction of rotation of said first member is changed.

* * * * *